(12) United States Patent  (10) Patent No.: US 7,505,912 B2
Okuda et al.  (45) Date of Patent: Mar. 17, 2009

(54) NETWORK TELEPHONE SET AND AUDIO DECODING DEVICE

(75) Inventors: Kozo Okuda, Hirakata (JP); Mika Kirimoto, Higashiosaka (JP); Hiroyuki Hirai, Nara (JP); Hiroki Onishi, Tokyo (JP)

(73) Assignee: Sanyo Electric Co., Ltd., Osaka (JP)

( * ) Notice: Subject to any disclaimer, the term of this patent is extended or adjusted under 35 U.S.C. 154(b) by 820 days.

(21) Appl. No.: 10/671,714

(22) Filed: Sep. 29, 2003

(65) Prior Publication Data

US 2004/0204945 A1 Oct. 14, 2004

(30) Foreign Application Priority Data

Sep. 30, 2002 (JP) ............................. 2002-285567
Feb. 27, 2003 (JP) ............................. 2003-051467

(51) Int. Cl.
*G10L 21/00* (2006.01)
(52) U.S. Cl. ..................................................... 704/500
(58) Field of Classification Search .................. 704/500
See application file for complete search history.

(56) References Cited

U.S. PATENT DOCUMENTS

| | | | |
|---|---|---|---|
| 5,481,543 A | 1/1996 | Veltman | |
| 6,301,258 B1 | 10/2001 | Katseff et al. | |
| 6,377,931 B1 * | 4/2002 | Shlomot | ...................... 704/503 |

FOREIGN PATENT DOCUMENTS

| | | |
|---|---|---|
| JP | 57-158247 | 3/1981 |
| JP | 09-181695 | 7/1997 |
| JP | 09-292900 | 11/1997 |
| JP | 2000-29586 | 10/2000 |

OTHER PUBLICATIONS

Korean Office Aciton for corresponding Korean application No. 10-2003-67361, Apr. 17, 2006.
Notice of Rejection: Patent Application No. JP 2003-336494 Reference No. NQA1030024 Dispatch No. 446314 Mailing Date: Nov. 30, 2005 Date of Preparation of This Notice: Nov. 22, 2005 Attorney for Applicant: Hideyuki Kayama Provisions Applied: Article 29, Subsection 2.
Translation of Chinese Office Action, dated Dec. 9, 2005.

* cited by examiner

*Primary Examiner*—Angela A Armstrong
(74) *Attorney, Agent, or Firm*—McDermott Will & Emery LLP

(57) ABSTRACT

An audio decoding device includes a playback speed change device for changing, with respect to a decoded audio signal obtained by a decoding device, the playback speed thereof; an output buffer for temporarily storing a digital audio signal outputted from the playback speed change device; a read out device for reading out the digital audio signals stored in the output buffer at predetermined time intervals; a playback speed control device for controlling the playback speed change device on the basis of the number of packets stored in the jitter buffer; and decoding timing control means for controlling the timing of decoding by the decoding device on the basis of the amount of data stored in the output buffer.

10 Claims, 14 Drawing Sheets

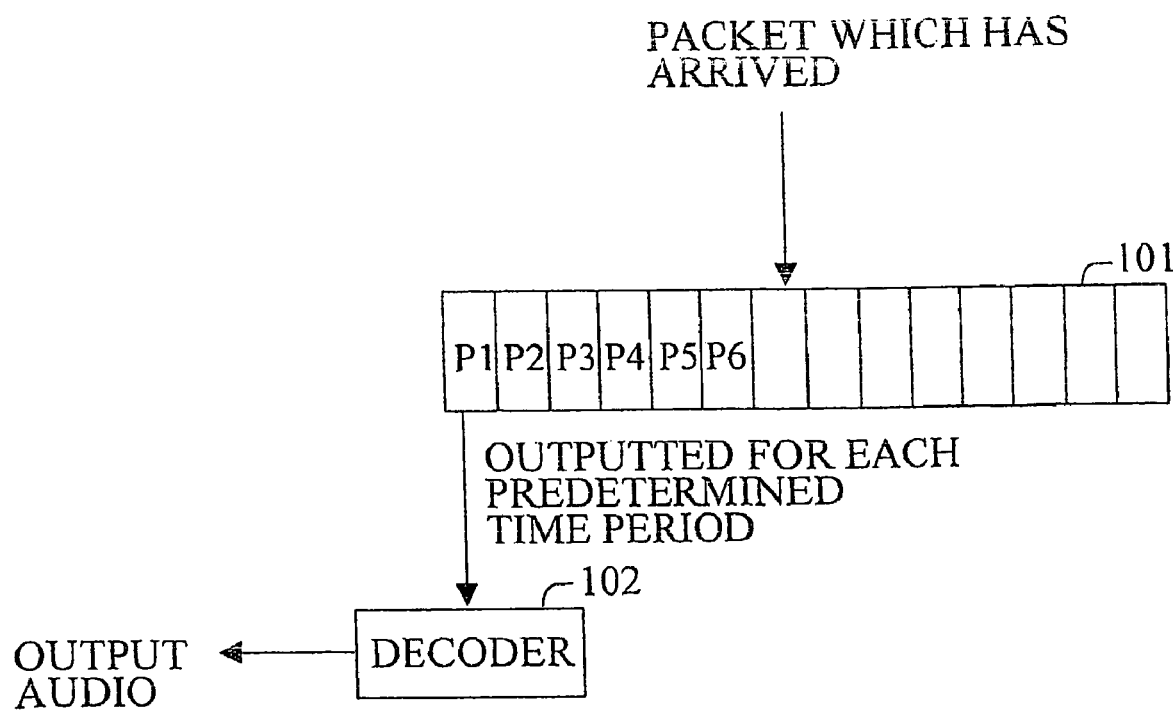

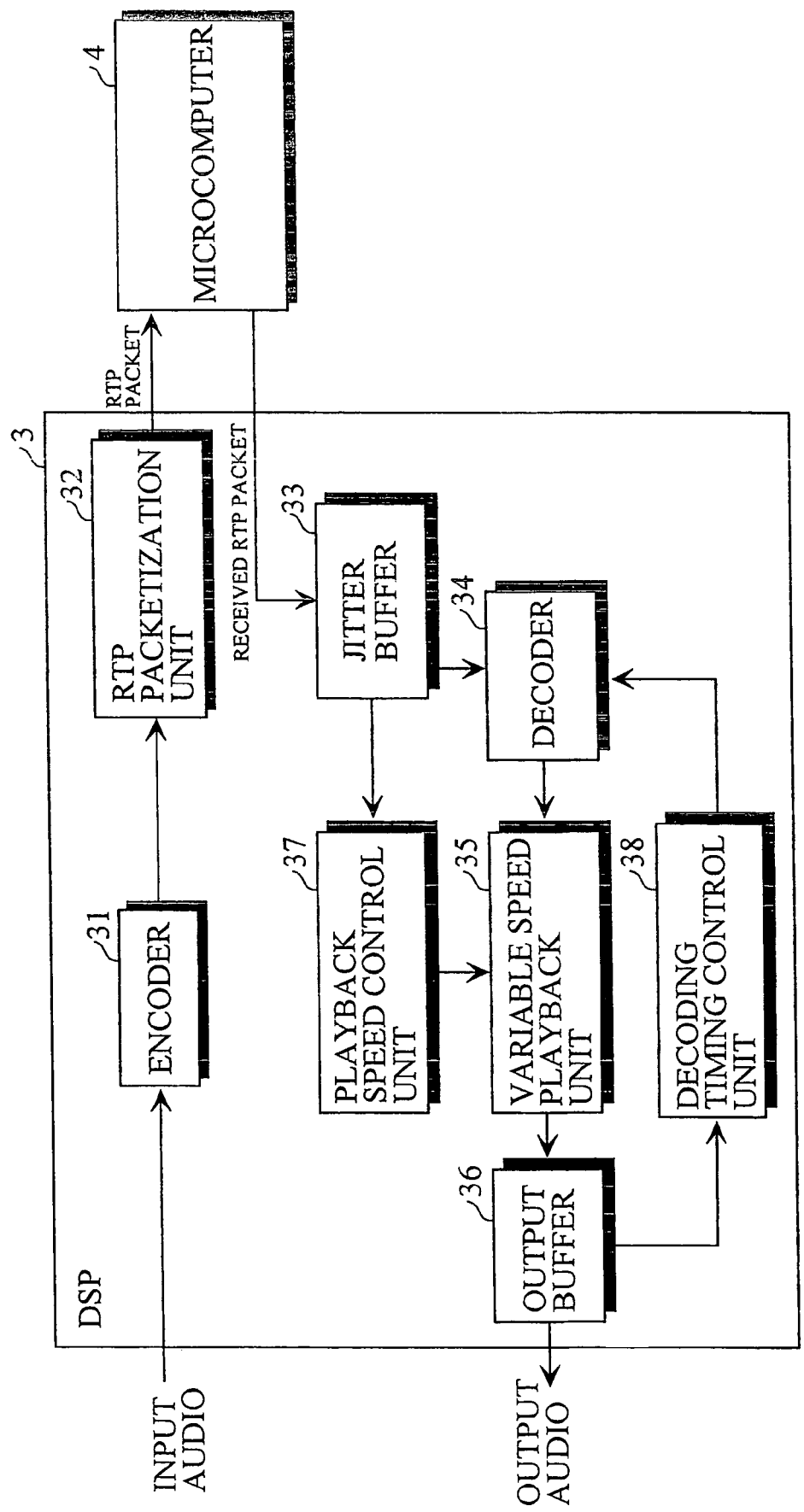

NETWORK TELEPHONE SET AND AUDIO DECODING DEVICE

BACKGROUND OF THE INVENTION

1. Field of the Invention

The present invention relates to a network telephone set and an audio decoding device that utilize VoIP of an Internet telephone set or the like.

2. Description of the Prior Art

For example, Internet telephone sets that carry out audio telephone conversations using the Internet have already been developed. The Internet telephone set utilizes a technique called "VoIP". VoIP (Voice over Internet Protocol) is a technique that makes it possible to carry out audio telephone conversations on a TCP/IP (Transmission Control Protocol/Internet Protocol) network such as the Internet or the intranet, that is, to transmit and receive audio data.

The Internet telephone set compresses an audio and then, packetizes the compressed audio, to carry out telephone conversations via an IP network, unlike a conventional telephone set. In this type of telephone conversation device, a variation (jitter) may occur in the times when packets arrive in many cases depending on the conditions of the IP network. That is, intervals of the packets which arrive via the IP network may not be fixed in many cases. In order to continuously output a decoded audio on the side of the receiving of the packets, however, coded data must be delivered to a decoder at predetermined intervals. Therefore, a jitter buffer 101 for absorbing the jitter is provided in the preceding stage of a decoder 102, as shown in FIG. 1.

The jitter buffer 101 comprises a plurality of buffer portions (packet storage portions) for respectively storing a plurality of packets. The packets which have arrived are stored in the order of their packet numbers from the left in the buffer portions in the jitter buffer 101. The packet stored in the buffer portion on the leftmost side is read out for each predetermined time period, and is delivered to the decoder 102. When one of the packets is delivered to the decoder 102, the other packets in the jitter buffer 101 are shifted one at a time leftward. The decoder 102 decodes the packet (coded data) delivered from the jitter buffer 101, and outputs the decoded packet.

As shown in FIG. 2a, at the time when the packet stored at the leftmost end of the jitter buffer 101 is delivered to the decoder 102, a distribution representing the positions of the buffer portions storing the packets which have arrived shall be called the distribution of the times when the packets arrive. The reason why such a distribution is called the distribution of the times when the packets arrive is that the distribution represents the distribution of the times when the packets which have arrived are stored in a case where the left end of the jitter buffer 101 is taken as the origin, the time is taken in the rightward direction, and the probability is taken in the upward direction. When the distribution of the times when the packets arrive is S0, as shown in FIG. 2a, the jitter buffer 101 efficiently functions. In the distribution S0 of the times when the packets arrive, as shown in FIG. 2a, the probability that the packet which has arrived is stored in the fifth buffer portion from the left is the highest.

When fixed delay in the IP network is reduced during telephone conversations, the distribution of the packets which arrive at the jitter buffer 101 is moved from S0 to S1, as shown in FIG. 2b. In this case, the time T is fixedly delayed in the jitter buffer 101, which causes interference with smooth telephone conversations, although the fixed delay in the IP network is reduced.

When the fixed delay in the IP network is increased during telephone conversations, the distribution of the packets which arrive at the jitter buffer 101 is moved from S0 to S2, as shown in FIG. 2c. In this case, the packet which arrives at a portion departing from the jitter buffer 101 cannot be outputted to the decoder 102, so that the audio quality is degraded, similarly to the packet loss.

When the amount of jitter in the IP network is increased during telephone conversations, the distribution of the packets which arrive at the jitter buffer 101 is changed from S0 to S3, as shown in FIG. 2d. In this case, the packet which arrives at the portion departing from the jitter buffer 101 cannot be outputted to the decoder 102, so that the audio quality is degraded, similarly to the packet loss.

When the amount of jitter in the IP network is reduced during telephone conversations, the distribution of the packets which arrive at the jitter buffer 101 is changed from S0 to S4, as shown in FIG. 2e. In this case, the time T is fixedly delayed in the jitter buffer 101, although a buffer amount required to absorb jitter in the IP network is reduced, so that the utilization efficiency of the jitter buffer 101 is low.

In order to make the distribution of the times when the packets arrive most suitable, it is considered that the number of packets stored in the jitter buffer 101 is adjusted. For example, when the distribution of the times when the packets arrive is as shown in FIG. 2b or 2e, the packets stored in the jitter buffer 101 are discarded (thinned), thereby making the distribution of the times when the packets arrive most suitable. Further, when the distribution of the times when the packets arrive is as shown in FIG. 2c or 2d, the packets stored in the jitter buffer 101 are duplicated, thereby making the distribution of the times when the packets arrive most suitable.

In a method of adjusting the number of packets stored in the jitter buffer 101 (the amount of storage of packets), however, the quality of an output audio is degraded depending on the discard or duplication of the packets.

Judgment whether or not the packets stored in the jitter buffer 101 should be discarded (thinned) or duplicated has been conventionally made by calculating an arrival delay deviation among the plurality of packets and on the basis of the calculated arrival delay deviation. In the judging method, however, a sufficient amount of data is required to calculate an arrival delay deviation (statistics) high in reliability, so that the control of the number of packets stored in the jitter buffer 101 is delayed.

The control of the number of packets stored in the jitter buffer 101 is, in other words, the control of a delay time period elapsed from the time when the packet is stored in the jitter buffer until the packet is decoded.

SUMMARY OF THE INVENTION

An object of the present invention is to provide a network telephone set and an audio decoding device that can adjust the distribution of the times when packets stored in a jitter buffer arrive such that the distribution is made most suitable without discarding or duplicating the packets.

Another object of the present invention is to provide a network telephone set and an audio decoding device that can reduce control delay in controlling a delay time period elapsed from the time when a packet is stored in a jitter buffer until the packet is decoded.

In an audio decoding device comprising a jitter buffer for storing a received packet, and decoding means for decoding the packet stored in the jitter buffer, a first audio decoding device according to the present invention is characterized by comprising playback speed change means for changing, with respect to a decoded audio signal obtained by the decoding means, the playback speed thereof; an output buffer for temporarily storing a digital audio signal outputted from the playback speed change means; means for reading out the digital audio signals stored in the output buffer at predetermined time intervals; playback speed control means for controlling the playback speed change means on the basis of the number of packets stored in the jitter buffer; and decoding timing control means for controlling the timing of decoding by the decoding means on the basis of the amount of data stored in the output buffer.

An example of the playback speed control means is one for controlling the playback speed change means such that the playback speed is reduced when the number of packets stored in the jitter buffer is less than a first predetermined reference value, while controlling the playback speed change means such that the playback speed is increased when a state where the number of packets stored in the jitter buffer is more than a second predetermined reference value which is not less than the first predetermined reference value is continued for a predetermined time period.

An example of the decoding timing control means is one for requiring the decoding means to decode the packet when the amount of data stored in the output buffer is less than a predetermined reference value.

In an audio decoding device comprising a jitter buffer for storing a received packet, and decoding means for decoding the packet stored in the jitter buffer, a second audio decoding device according to the present invention is characterized by comprising delay time control means for carrying out such control that a delay time period elapsed from the time when the packet is stored in the jitter buffer until the packet is decoded is lengthened when the number of packets stored in the jitter buffer is less than a first predetermined reference value, while carrying out such control that a delay time period elapsed from the time when the packet is stored in the jitter buffer until the packet is decoded is shortened when a state where the number of packets stored in the jitter buffer is more than a second predetermined reference value which is not less than the first predetermined reference value is continued for a predetermined time period.

An example of the delay time control means is one comprising playback speed change means for changing, with respect to a decoded audio signal obtained by the decoding means, the playback speed thereof; an output buffer for temporarily storing a digital audio signal outputted from the playback speed change means, means for reading out the digital audio signals stored in the output buffer at predetermined time intervals, and means for controlling the playback speed change means such that the playback speed is reduced when the number of packets stored in the jitter buffer is less than the first predetermined reference value, while controlling the playback speed change means such that the playback speed is increased when a state where the number of packets stored in the jitter buffer is more than the second predetermined reference value which is not less than the first predetermined reference value is continued for a predetermined time period.

An example of the delay time control means is one for controlling the packet to be read out of the jitter buffer and fed to the decoding means such that the packet read out of the jitter buffer at the timing of packet reading is repeatedly decoded at the timing of packet reading continued a plurality of number of times including the current time, and the read-out of the packet from the jitter buffer is inhibited during the decoding when the number of packets stored in the jitter buffer is less than the first predetermined reference value, while controlling the packet to be read out of the jitter buffer and fed to the decoding means such that the plurality of packets stored in the jitter buffer are read out at a time at the timing of packet reading, and one of the packets is decoded and the other packets are discarded when the state where the number of packets stored in the jitter buffer is more than the second predetermined reference value which is not less than the first predetermined reference value is continued for a predetermined time period.

In a network telephone set comprising a jitter buffer for storing a received packet, and decoding means for decoding the packet stored in the jitter buffer, a first network telephone set according to the present invention is characterized by comprising playback speed change means for changing, with respect to a decoded audio signal obtained by the decoding means, the playback speed thereof; an output buffer for temporarily storing a digital audio signal outputted from the playback speed change means; means for reading out the digital audio signals stored in the output buffer at predetermined time intervals; playback speed control means for controlling the playback speed change means on the basis of the number of packets stored in the jitter buffer; and decoding timing control means for controlling the timing of decoding by the decoding means on the basis of the amount of data stored in the output buffer.

An example of the playback speed control means is one for controlling the playback speed change means such that the playback speed is reduced when the number of packets stored in the jitter buffer is less than a first predetermined reference value, while controlling the playback speed change means such that the playback speed is increased when a state where the number of packets stored in the jitter buffer is more than a second predetermined reference value which is not less than the first predetermined reference value is continued for a predetermined time period.

An example of the decoding timing control means is one for requiring the decoding means to decode the packet when the amount of data stored in the output buffer is less than a predetermined reference value.

In a network telephone set comprising a jitter buffer for storing a received packet, and decoding means for decoding the packet stored in the jitter buffer, a second network telephone set according to the present invention is characterized by comprising delay time control means for carrying out such control that a delay time period elapsed from the time when the packet is stored in the jitter buffer until the packet is decoded is lengthened when the number of packets stored in the jitter buffer is less than a first predetermined reference value, while carrying out such control that a delay time period elapsed from the time when the packet is stored in the jitter buffer until the packet is decoded is shortened when a state where the number of packets stored in the jitter buffer is more than a second predetermined reference value which is not less than the first predetermined reference value is continued for a predetermined time period.

An example of the delay time control means is one comprising playback speed change means for changing, with respect to a decoded audio signal obtained by the decoding means, the playback speed thereof; an output buffer for temporarily storing a digital audio signal outputted from the playback speed change means, means for reading out the digital audio signals stored in the output buffer at predetermined time intervals, and means for controlling the playback speed change means such that the playback speed is reduced when the number of packets stored in the jitter buffer is less than the first predetermined reference value, while controlling the playback speed change means such that the playback speed is increased when the state where the number of packets stored in the jitter buffer is more than the second predetermined reference value which is not less than the first predetermined reference value is continued for a predetermined time period.

An example of the delay time control means is one for controlling the packet to be read out of the jitter buffer and fed to the decoding means such that the packet read out of the jitter buffer at the timing of packet reading is repeatedly decoded at the timing of packet reading continued a plurality of number of times including the current time, and the readout of the packet from the jitter buffer is inhibited during the decoding when the number of packets stored in the jitter buffer is less than the first predetermined reference value, while controlling the packet to be read out of the jitter buffer and fed to the decoding means such that the plurality of packets stored in the jitter buffer are read out at a time at the timing of packet reading, and one of the packets is decoded and the other packets are discarded when the state where the number of packets stored in the jitter buffer is more than the second predetermined reference value which is not less than the first predetermined reference value is continued for a predetermined time period.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a conventional technique;

FIG. 4 is a block diagram showing the configuration of a DSP shown in FIG. 3;

DESCRIPTION OF THE PREFERRED EMBODIMENTS

Referring now to FIGS. 3 to 14, embodiments in a case where the present invention is applied to an Internet telephone.

[A] Description of First Embodiment

[1] Description of Configuration of Internet Telephone Set

Figure 2A:
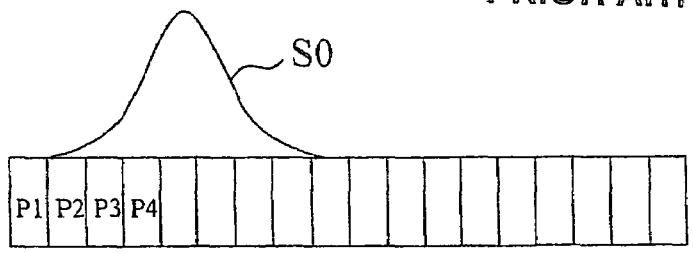
FIGS. 2a to 2e are schematic views for explaining the problem of the conventional technique shown in FIG. 1.
Figure 2B:
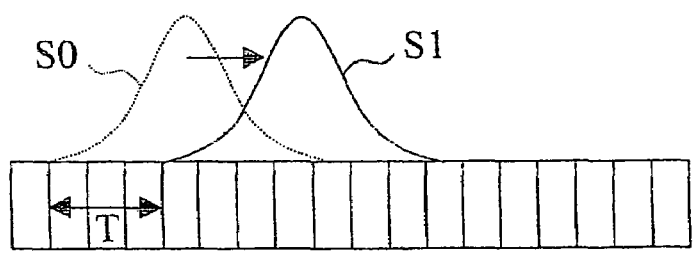
Figure 2C:
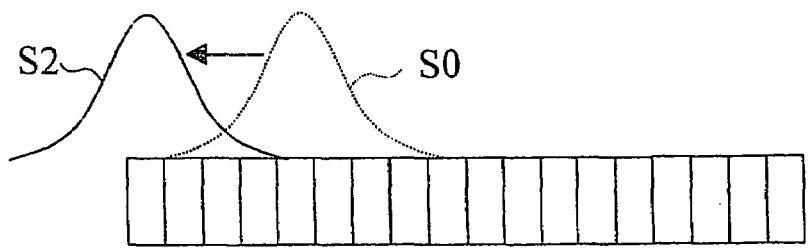
Figure 2D:
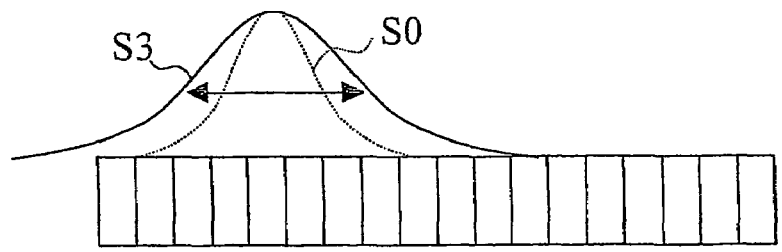
Figure 2E:
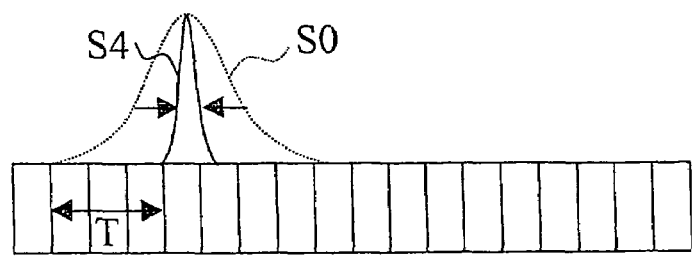
Figure 3:
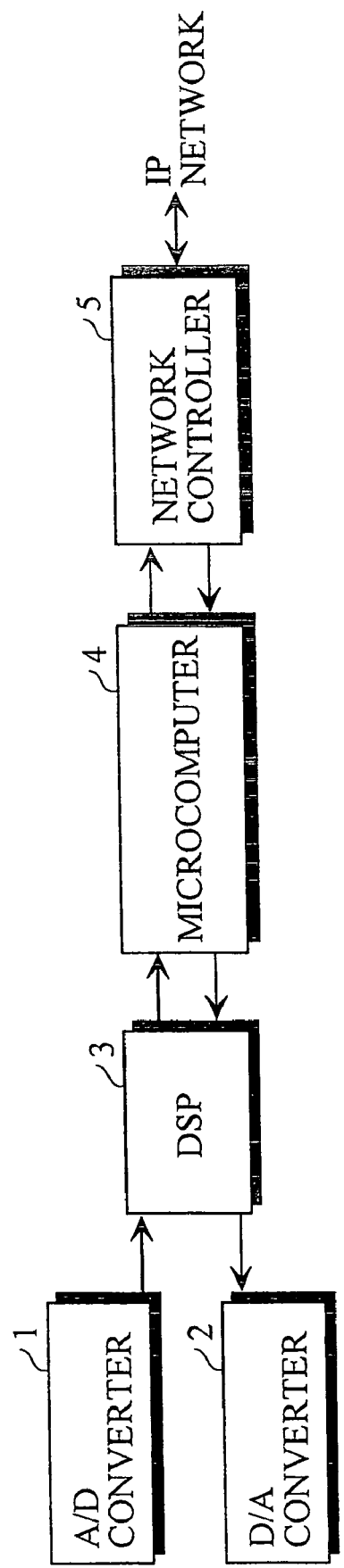
FIG. 3 is a block diagram showing the configuration of an Internet telephone set.

FIG. 3 illustrates the configuration of an Internet telephone set.

The Internet telephone set comprises an A/D (Analog-to-Digital) converter 1, a D/A (Digital-to-Analog) converter 2, a DSP (Digital Signal Processor) (an audio decoding device) 3, a microcomputer 4, and a network controller 5.

An input audio signal is converted into a digital audio signal by the A/D converter 1, and the digital audio signal is then fed to the DSP 3. In the DSP 3, the digital audio signal is compressed, and is then packetized. A packet obtained by the DSP 3 is sent out to an IP (Internet Protocol) network through the microcomputer 4 and the network controller 5.

The packet which has sent via the IP network is sent to the DSP 3 through the network controller 5 and the microcomputer 4. In the DSP 3, the packet is decoded. The digital audio signal obtained by the DSP 3 is converted into an analog audio signal by the D/A converter 2, and the analog audio signal is outputted.

FIG. 4 illustrates the detailed configuration of the DSP 3.

The DSP 3 comprises means for generating packets to be transmitted, and means for generating a decoded audio signal.

The means for generating packets to be transmitted comprises an encoder 31 for compressing an input audio signal inputted from the A/D converter 1, and an RTP (Real-Time Transport Protocol) packetization unit 32 for packetizing coded data obtained by the encoder 31 to generate an RTP packet.

The means for generating a coded audio signal comprises a jitter buffer 33, a decoder 34, a playback speed change unit (hereinafter referred to as a variable speed playback unit) 35, an output buffer 36, a playback speed control unit 37, and a decoding timing control unit 38. Although the playback speed control unit 37 and the decoding timing control unit 38 are actually constituted by one control unit, they are respectively illustrated as separate control units for convenience.

The jitter buffer 33 comprises a plurality of buffer portions (packet storage portions), similarly to the jitter buffer 101 shown in FIG. 1. The packets which have arrived are stored in the order of their packet numbers from the left in the buffer portions in the jitter buffer 33. The packet stored in the buffer portion on the leftmost side is read out at predetermined timing, and is delivered to the decoder 34. When one of the packets is delivered to the decoder 34, the other packets in the jitter buffer. 33 are shifted one at a time leftward.

The decoder 34 decodes the packet (coded data) delivered from the jitter buffer 33. A coded audio signal obtained by the decoder 34 is fed to the variable speed playback unit 35, and is subjected to playback speed change processing (voice speed conversion processing). A digital audio signal outputted from the variable speed playback unit 35 is stored in the output buffer 36. The digital audio signals stored in the output buffer 36 are sequentially read out one at a time for each predetermined time interval, and are outputted to the D/A converter 2.

The playback speed control unit 37 controls the variable speed playback unit 35 on the basis of a buffer amount in the jitter buffer 33 (the number of stored packets). The decoding timing control unit 38 controls the timing of decoding by the decoder 34 on the basis of the amount of data stored in the output buffer 36.

Means for generating the decoded audio signal is characterized in that the playback speed of the decoded audio signal is controlled depending on the buffer amount in the jitter buffer 33 (the number of stored packets), to control the timing of the output of the packets from the jitter buffer 33 (the timing of decoding). The packets are outputted from the jitter buffer 33 when the amount of data stored in the output buffer 36 is below a predetermined reference value.

Consequently, it is possible to adjust the buffer amount in the jitter buffer 33, that is, a delay time period elapsed from the time when the packet is stored in the jitter buffer 33 until the packet is decoded such that the distribution of the times when the packets arrive is at the most suitable location without discarding or duplicating the packets stored in the jitter buffer 33. Only the playback speed of a replayed audio is changed without changing the pitch width thereof.

[2] Description of Operations of Means for Generating Decoded Audio Signal

The operations of the means for generating a decoded audio signal will be described in more detail.

Figure 5A:
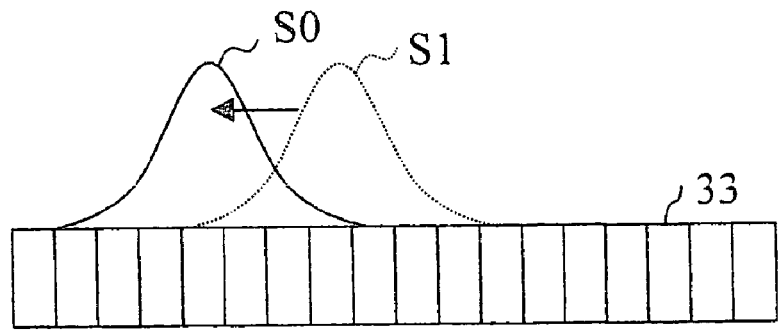
FIGS. 5a to 5d are schematic views for explaining the basic idea of the present invention.
Figure 6:
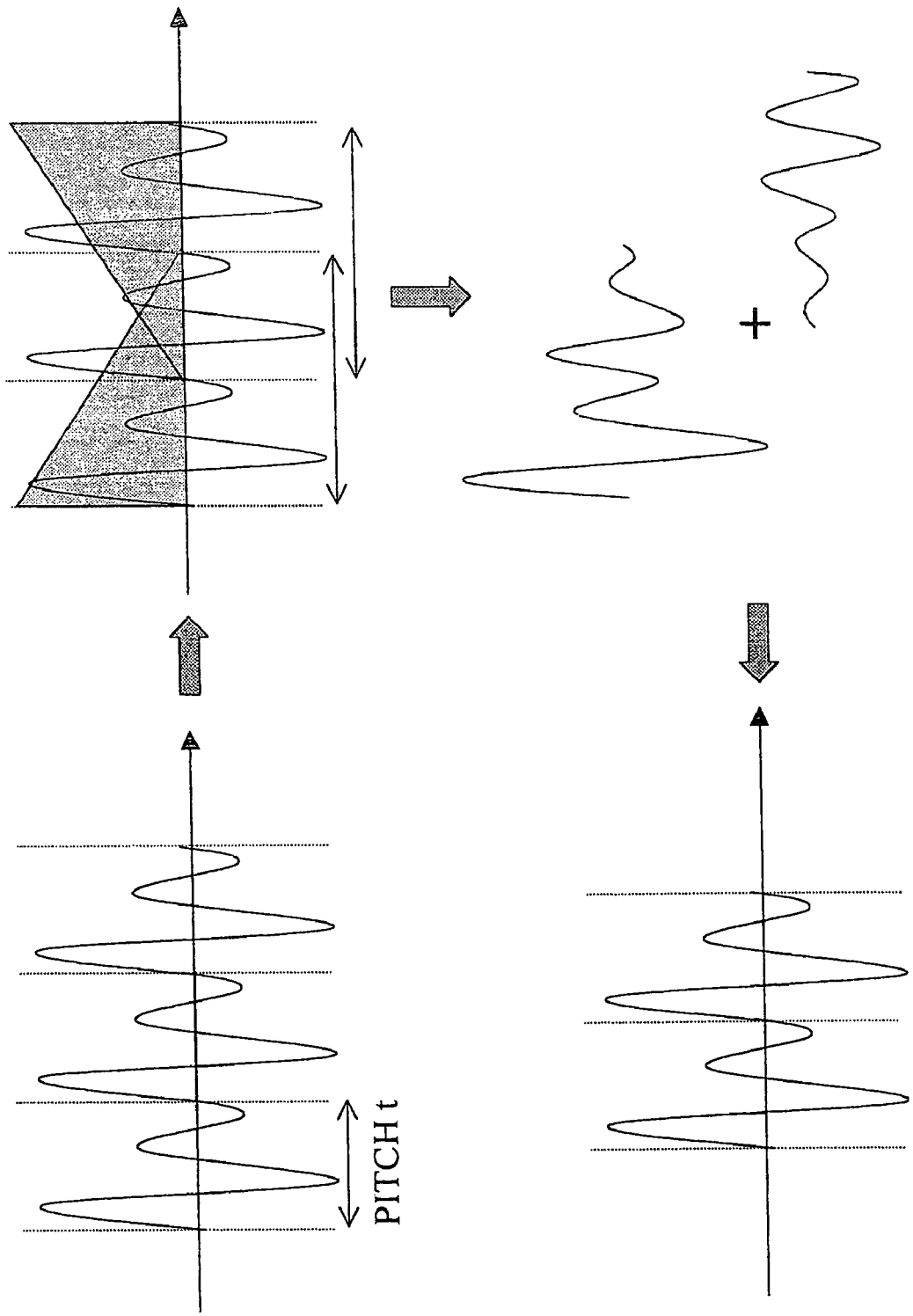
FIG. 6 is a schematic view for explaining the contents of processing of a variable speed playback unit 35 in a case where the playback speed is increased.

In a case where during telephone conversations, the distribution of the packets which arrive at the jitter buffer 33 is a distribution as indicated by a broken line S1 in FIG. 5a, and it is desired to move the distribution as a distribution S0 indicated by a solid line, the variable speed playback unit 35 is controlled such that the playback speed is increased. The variable speed playback unit 35 generates a waveform corresponding to two pitches from a waveform corresponding to three pitches, as shown in FIG. 6, for example, when the playback speed is increased.

That is, a weight indicated by a straight line directed downward toward the right is first added to a waveform corresponding to two pitches from the front in a waveform corresponding to three pitches in an original waveform, and a weight indicated by a straight line directed upward to the right is added to a waveform corresponding to two pitches from the rear. The waveforms corresponding to two pitches are added together, thereby generating a waveform corresponding to two pitches.

When the playback speed is thus increased, the amount of data corresponding to one packet is reduced. Accordingly, the timing at which data stored in the output buffer 36 is below a predetermined reference value is advanced, and the timing of the output of the packet from the jitter buffer 33 (the timing of decoding) is advanced. In other words, a delay time period elapsed from the time when the packet is stored in the jitter buffer 33 until the packet is decoded is shortened. As a result, the distribution of the times When the packets arrive is moved to the most suitable location so.

Figure 5B:
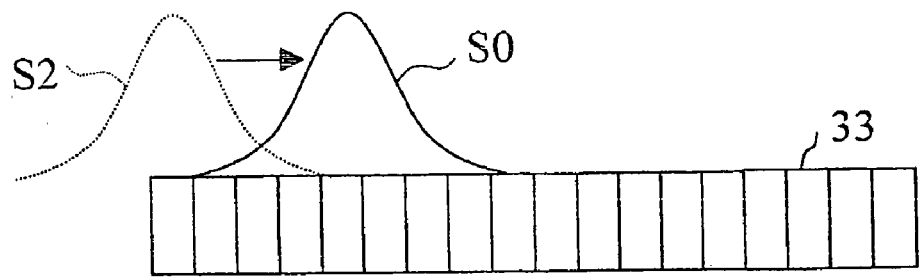
Figure 7:
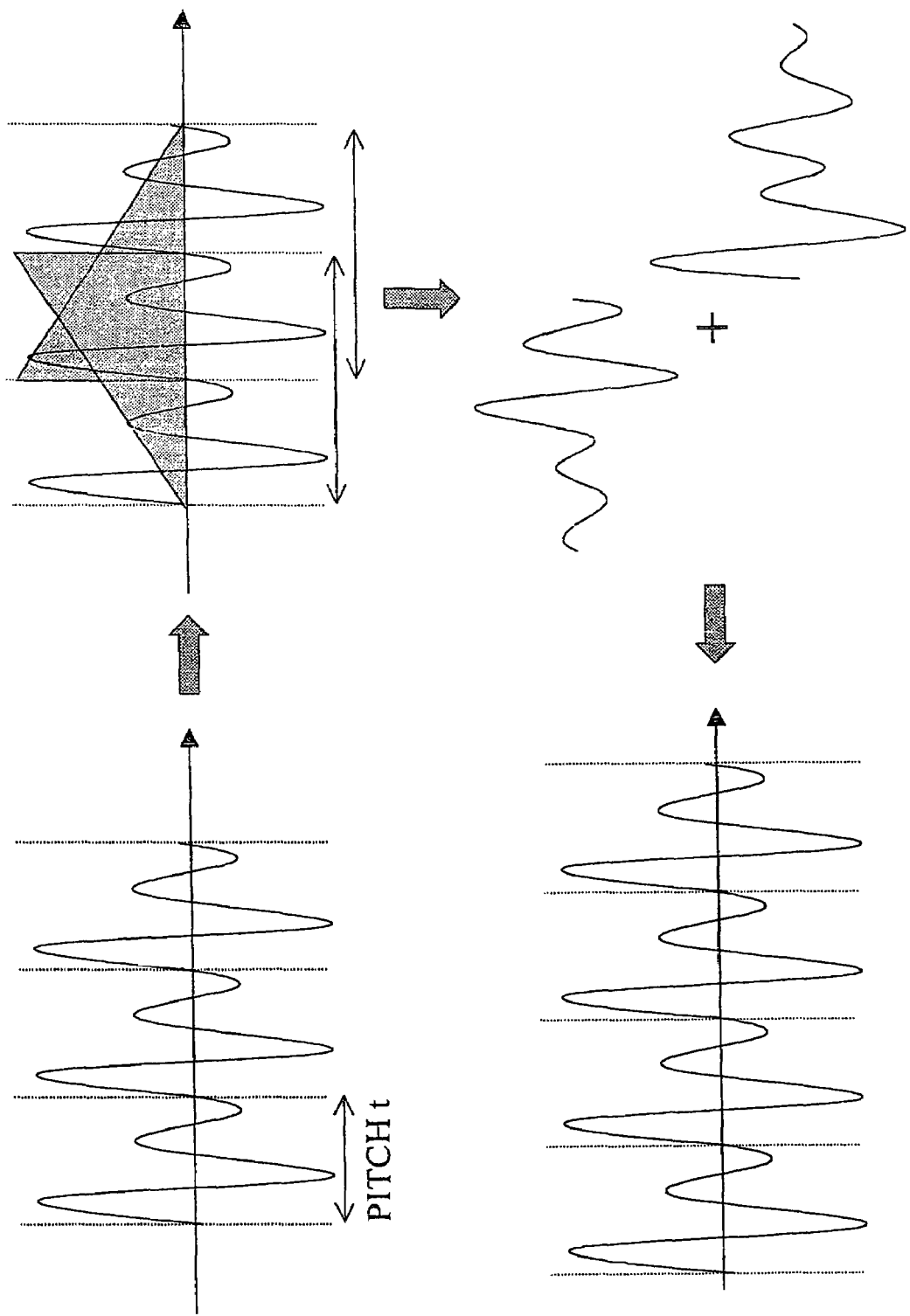
FIG. 7 is a schematic view for explaining the contents of processing of a variable speed playback unit 35 in a case where the playback speed is reduced.

In a case where during telephone conversations, the distribution of the packets which arrive at the jitter buffer 33 is a distribution as indicated by a broken line S2 in FIG. 5b, and it is desired to move the distribution as a distribution S0 indicated by a solid line, the variable speed playback unit 35 is controlled such that the playback speed is reduced. The variable speed playback unit 35 generates a waveform corresponding to four pitches from a waveform corresponding to three pitches, as shown in FIG. 7, for example, when the playback speed is reduced.

That is, a weight indicated by a straight line directed upward toward the right is first added to a waveform corresponding to two pitches from the front in a waveform corresponding to three pitches in an original waveform, and a weight indicated by a straight line directed downward to the right is added to a waveform corresponding to two pitches from the rear. The waveforms corresponding to two pitches are added together, thereby generating a waveform corresponding to two pitches. The obtained waveform is replaced with a waveform corresponding to one pitch at the center of the original waveform, thereby generating a waveform corresponding to four pitches.

When the playback speed is thus reduced, the amount of data corresponding to one packet is increased. Accordingly, the timing at which data stored in the output buffer 36 is below a predetermined reference value is delayed, and the timing of the output of the packet from the jitter buffer 33 (the timing of decoding) is delayed. In other words, a delay time period elapsed from the time when the packet is stored in the jitter buffer 33 until the packet is decoded is lengthened. As a result, the distribution of the times when the packets arrive is moved to the most suitable location so.

Figure 5C:
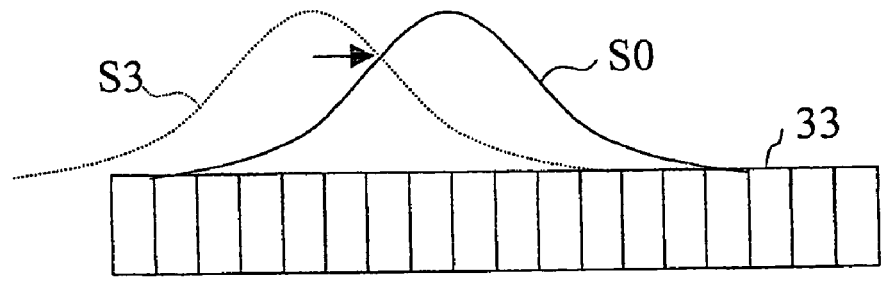

In cases where during telephone conversations, the amount of jitter in the IP network is increased, and the distribution of the packets which arrive at the jitter buffer 33 is a distribution as indicated by a broken line S3 in FIG. 5c, and it is desired to move the distribution as a distribution S0 indicated by a solid line, the variable speed playback unit 35 is controlled such that the playback speed is reduced, thereby delaying the timing of the output of the packet from the jitter buffer 33.

Figure 5D:
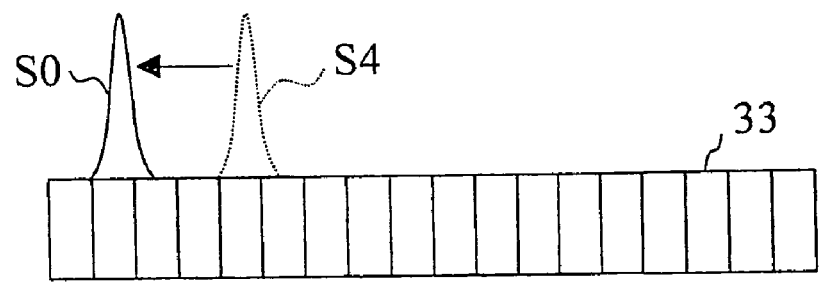

In cases where during telephone conversations, the amount of jitter in the IP network is increased, and the distribution of the packets which arrive at the jitter buffer 33 is a distribution as indicated by a broken line S4 in FIG. 5d, and it is desired to move the distribution as a distribution S0 indicated by a solid line, the variable speed playback unit 35 is controlled such that the playback speed is increased, thereby advancing the timing of the output of the packet from the jitter buffer 33.

[3] Description of Control of Playback Speed Carried out by Playback Speed Control Unit 37

Figure 8:
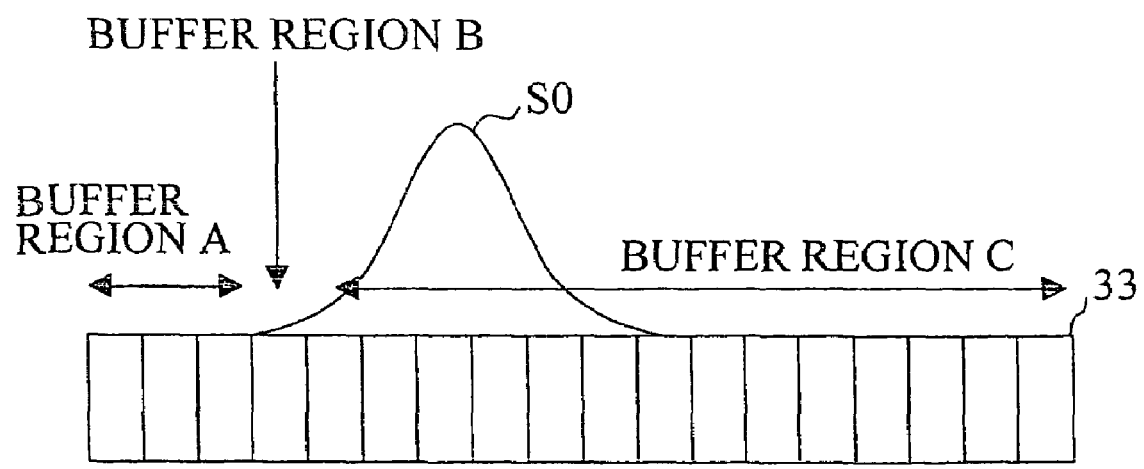
FIG. 8 is a schematic view for explaining the control of the playback speed.

In FIG. 8, it is assumed that the packet is read out of the buffer portion at the left end of the jitter buffer 33, and S0 is taken as a target distribution of the times when the packets arrive. A region composed of the three buffer portions at the left end of the jitter buffer 33 is defined as a buffer region A, a region composed of the one buffer portion adjacent to the buffer region A on the right side is defined as a buffer region B, and a region at the right of the buffer region B is defined as a buffer region C. The number of buffer portions in each of the regions A, B, and C can be changed by setting.

Figure 9A:
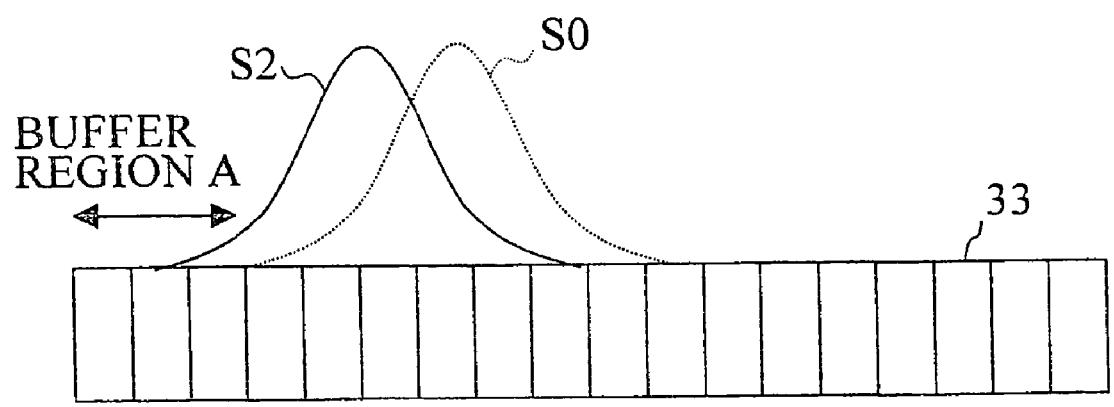
FIGS. 9a and 9b are schematic views for explaining the basic idea of the control of the playback speed.

Description is now made of the basic idea of the control of the playback speed. When the actual distribution S2 of the times when the packets arrive is shifted leftward from the target distribution S0 of the times when the packets arrive, as shown in FIG. 9a, the packet which has arrived is stored in the buffer region A in the jitter buffer 33. When the packet which has arrived is stored in the buffer region A, therefore, the playback speed control unit 37 controls the variable speed playback unit 35 such that the playback speed is reduced. As a result, the timing of the output of the packet to the decoder 34 (the timing of decoding) is delayed.

Figure 9B:
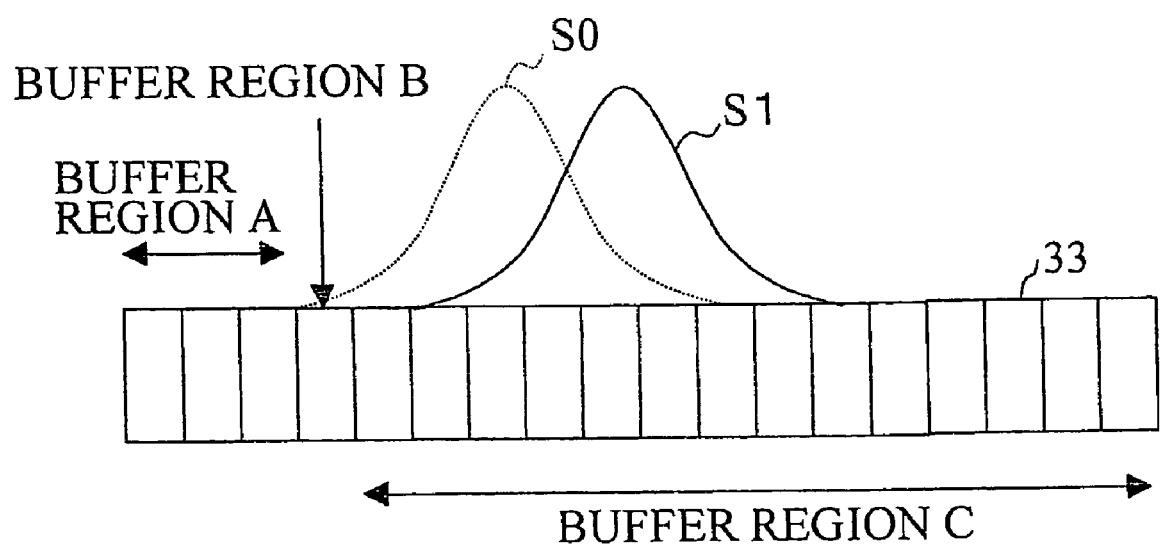

On the other hand, when the actual distribution S1 of the times when the packets arrive is shifted rightward from the target distribution S0 of the times when the packets arrive, as shown in FIG. 9b, the packet which has arrived is not stored in a region composed of the buffer regions A and B in the jitter buffer 33 for a predetermined time period. That is, the packet which has arrived is stored in only the buffer region C for a predetermined time period. When the packet which has arrived is not stored in the region composed of the buffer regions A and B for the predetermined time period, therefore, the playback speed control unit 37 controls the variable speed playback unit 35 such that the playback speed is increased. As a result, the timing of the output of the packet to the decoder 34 (the timing of decoding) is advanced.

Figure 10:
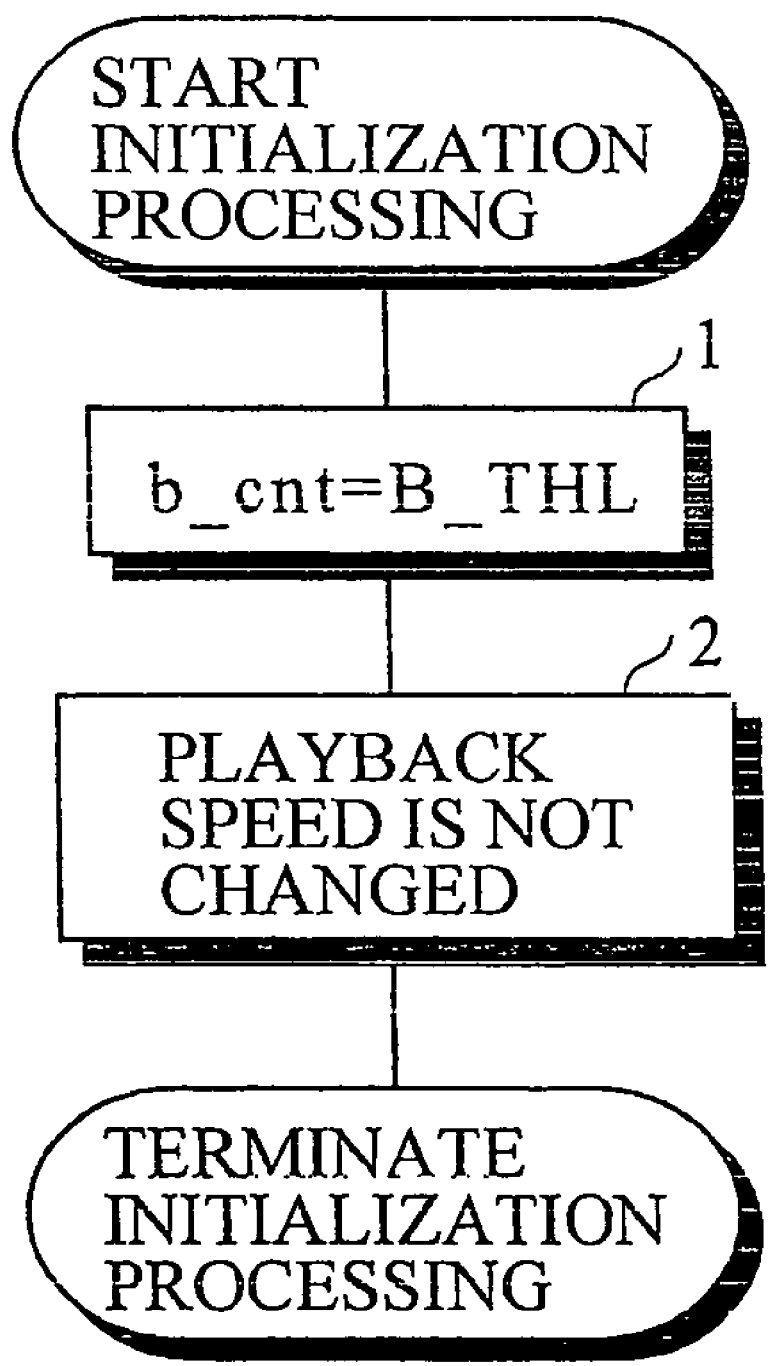
FIG. 10 is a flow chart showing the procedure for initialization processing.

FIG. 10 shows the procedure for initialization processing.

In initialization processing performed when the power is turned on, a predetermined value B_THL (e.g., 100) is set in a counter b_cnt (step 1). Further, the contents of control of the playback speed to be given to the variable speed playback unit 35 are set to a state where the playback speed is not changed (step 2).

Figure 11:
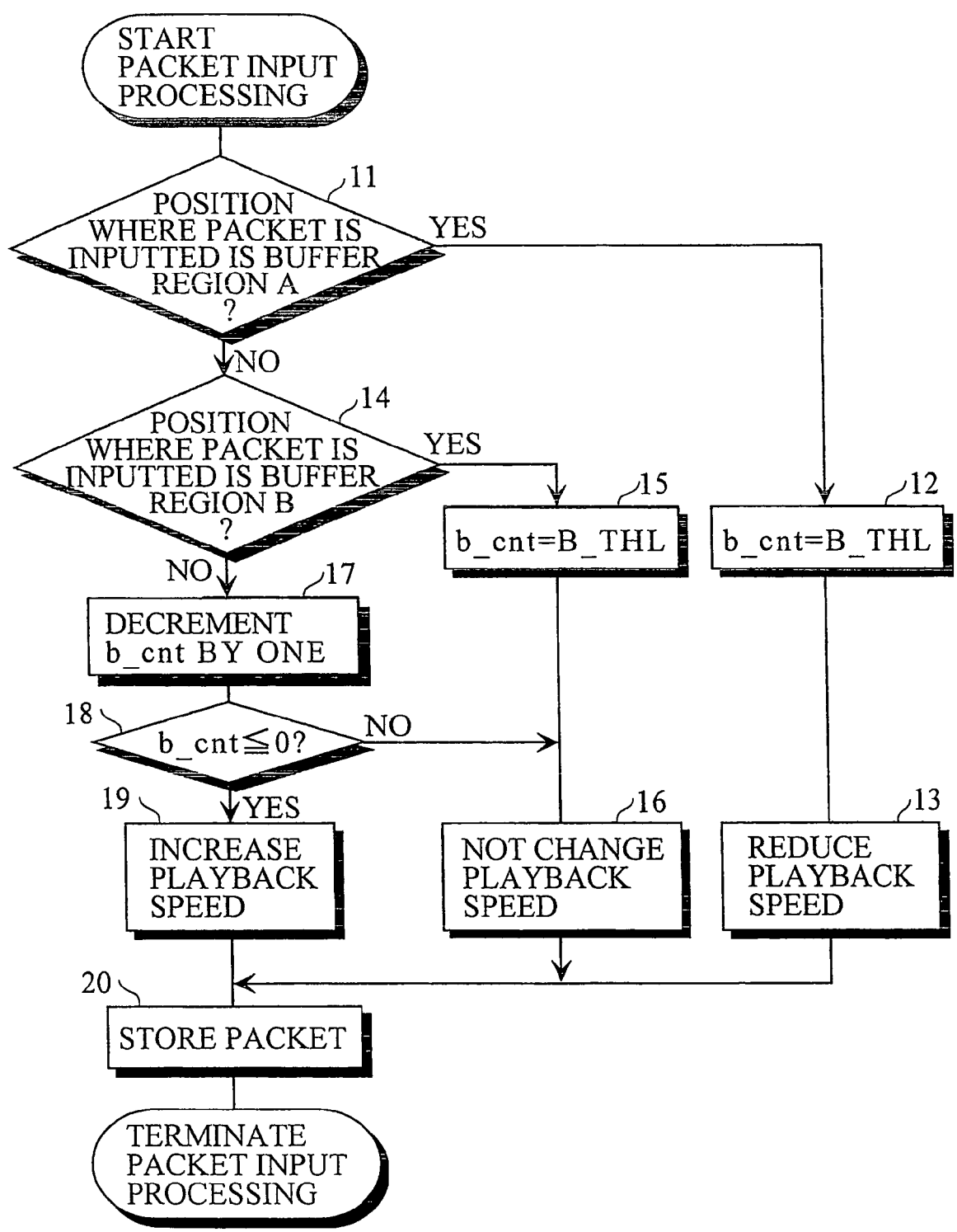
FIG. 11 is a flow chart showing the procedure for playback speed control processing.

FIG. 11 shows the procedure for processing for controlling the playback speed.

Processing for controlling the playback speed is performed every time processing for inputting the packet which has arrived to the jitter buffer 33 is started.

When the packet input processing is started, it is judged whether or not the position where the packet is inputted to the jitter buffer 33 is the buffer region A shown in FIG. 8 (step 11). When the position where the packet is inputted is the buffer region A, it is judged that the actual distribution S2 of the times when the packets arrive is shifted leftward from the target distribution S0 of the times when the packets arrive, as shown in FIG. 9a, to store the predetermined value B_THL in the counter b_cnt (step 12), and set the contents of control of the playback speed to a state where the playback speed is reduced (step 13). The packet is stored in the jitter buffer 33 (step 20), to terminate the current packet input processing.

When it is judged in the foregoing step 11 that the position where the packet is inputted is not the buffer region A, it is judged whether or not the position where the packet is inputted is the buffer region B (step 14). When the position where the packet is inputted is the buffer region B, it is judged that the possibility that the actual distribution of the times when the packets arrive coincides with the target distribution of the times when the packets arrive is high, to store the predetermined value B_THL in the counter b_cnt (step 15), and set the contents of control of the playback speed to a state where the playback speed is not changed (step 16). The packet is stored in the jitter buffer 33 (step 20), to terminate the current packet input processing.

When it is judged in the foregoing step 14 that the position where the packet is inputted is not the buffer region B, the counter value b_cnt is decremented by one (step 17). It is judged whether or not the counter value b_cnt is not more than zero (step 18). When the counter value b_cnt is more than zero, it is judged that the possibility that the actual distribution of the times when the packets arrive coincides with the target distribution of the times when the packets arrive is high, to set the contents of control of the playback speed to a state where the playback speed is not changed (step 16). The packet is stored in the jitter buffer 33 (step 20), to terminate the current packet input processing.

When it is judged in the foregoing step, 18 that the counter value b_cnt is not more than zero, it is judged that the actual distribution S1 of the times when the packets arrive is shifted rightward from the target distribution S0 of the times when the packets arrive, as shown in FIG. 9b, to set the contents of control of the playback speed to a state where the playback speed is increased (step 19). The packet is stored in the jitter buffer 33 (step 20), to terminate the current packet input processing.

[4] Description of Procedure for Processing for Controlling Timing of Decoding

Figure 12:
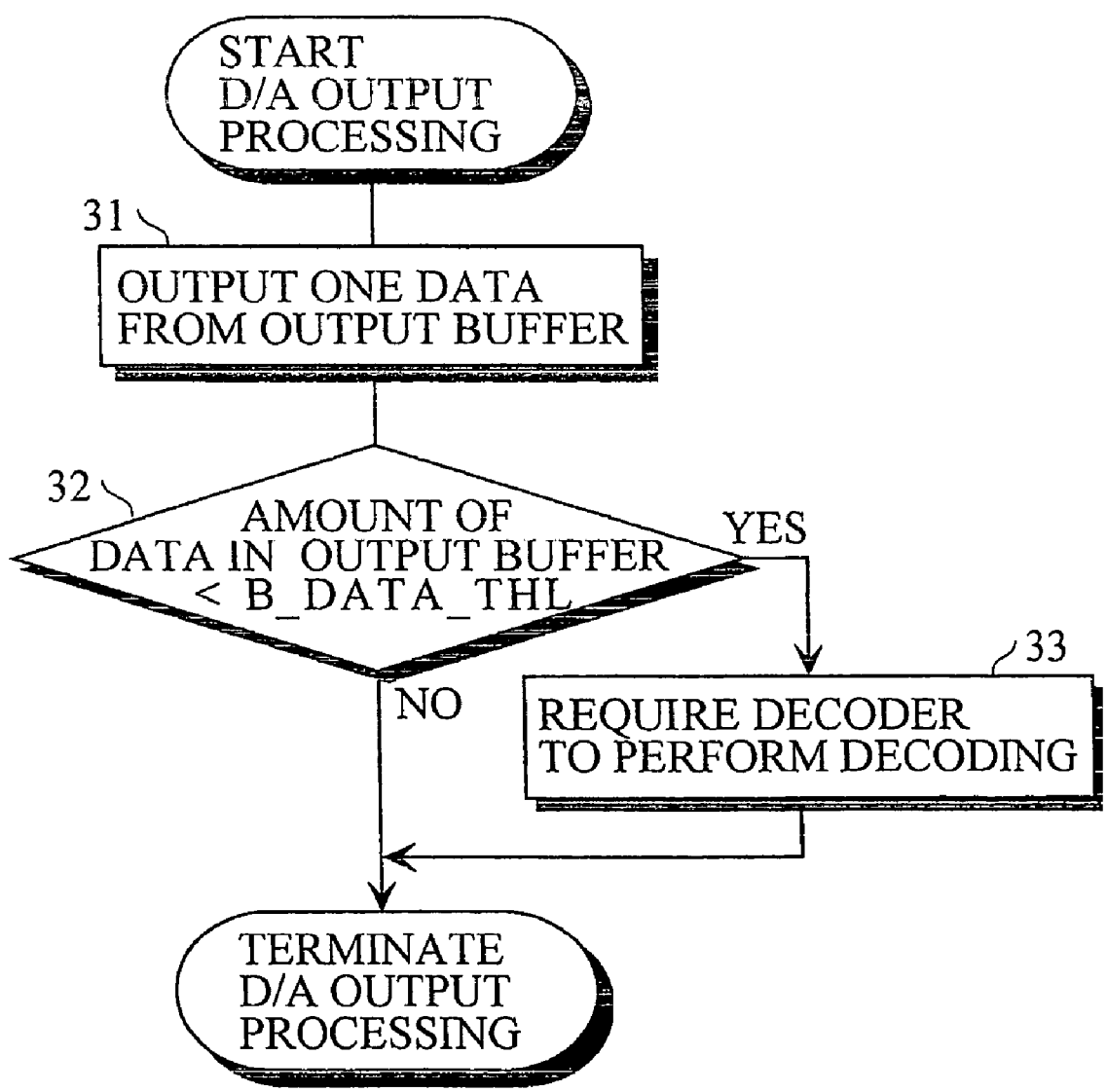
FIG. 12 is a flow chart showing the procedure for decoding timing control processing.

FIG. 12 shows the procedure for processing for controlling the timing of decoding.

When output processing to the D/A converter 2 (D/A output processing) is started, one data is outputted from the output buffer 36 (step 31). It is judged whether or not the amount of data in the output buffer 36 is less than a predetermined reference value B_DATA_THL (step 32). When the amount of data in the output buffer 36 is not less than the predetermined reference value, the current D/A output processing is terminated.

When it is judged in the foregoing step 32 that the amount of data in the output buffer 36 is less than the predetermined reference value B_DATA_THL, the decoder 34 is required to perform decoding (step 33), after which the current DIA output processing is terminated.

[B] Description of Second Embodiment

Although in a second embodiment, the overall configuration of an Internet telephone set is the same as that shown in FIG. 3, the configuration of a DSP 3 differs from that shown in FIG. 4.

Figure 13:
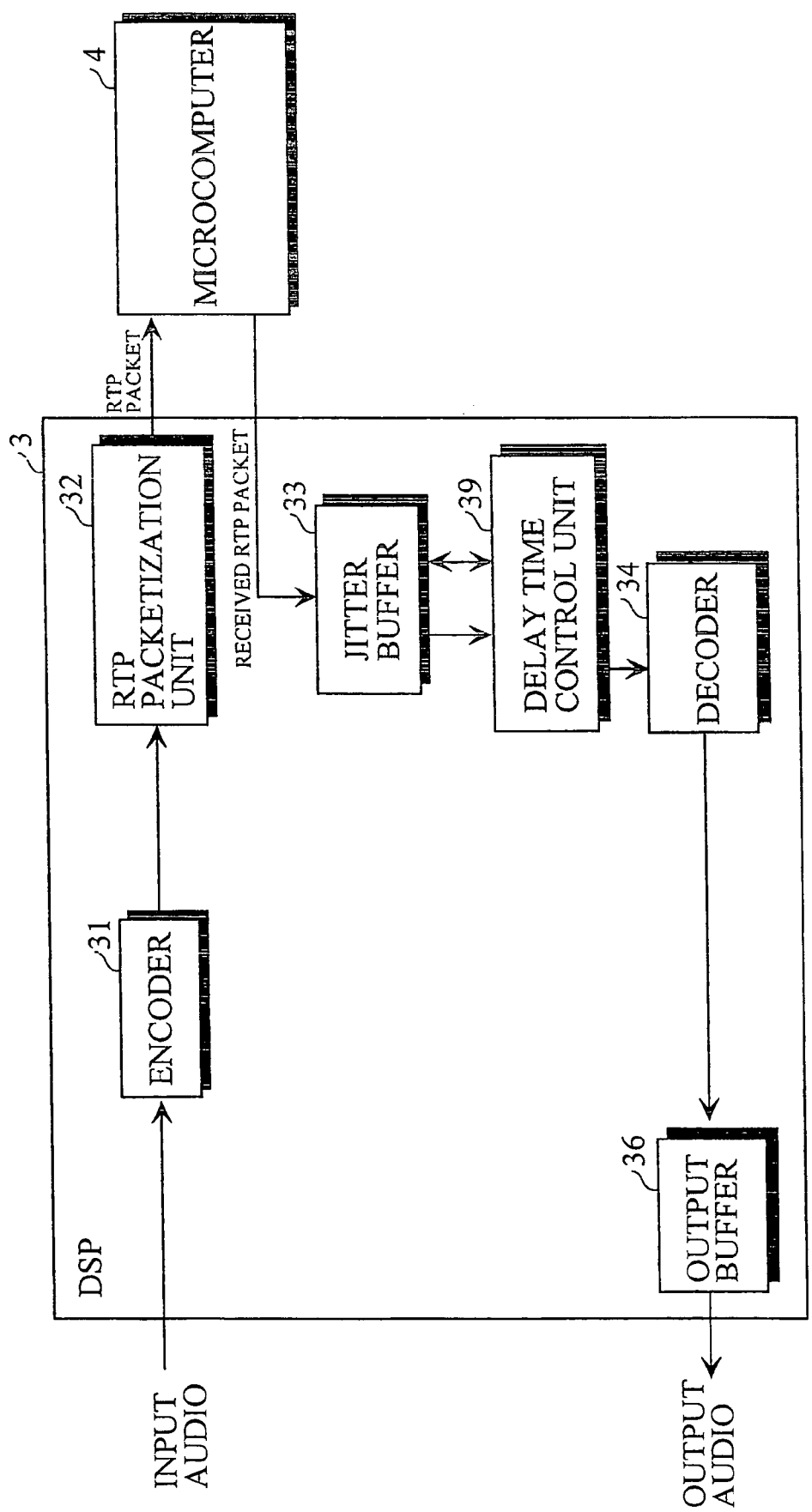
FIG. 13 is a block diagram showing another example of the configuration of a DSP.

FIG. 13 illustrates the detailed configuration of the DSP 3.

The DSP 3 comprises means for generating packets to be transmitted, and means for generating a decoded audio signal. The means for generating packets to be transmitted comprises an encoder 31 for compressing an input audio signal inputted from an A/D converter 1, and an RTP packetization unit 32 for packetizing coded data obtained by the encoder 31 to generate an RTP packet, similarly to that shown FIG. 4.

The means for generating a coded audio signal comprises a jitter buffer 33, a decoder 34, an output buffer 36, and a delay time control unit 39, unlike that shown in FIG. 4. The delay time control unit 39 is provided in the succeeding stage of the jitter buffer 33 and in the preceding stage of the decoder 34, and controls a delay time period elapsed from the time when the packet is stored in the jitter buffer 33 until the packet is decoded. In the present embodiment, the timing of read-out of the packet from the jitter buffer 33 (the timing of decoding) arrives for each predetermined time period.

Description is made of the control of the delay time period carried out by the delay time control unit 39.

In FIG. 8, it is assumed that the packet is read out of a buffer portion at the left end of the jitter buffer 33, and S0 is taken as a target distribution of the times when the packets arrive. A region composed of three buffer portions at the left end of the jitter buffer 33 is defined as a buffer region A, a region composed of the one buffer portion adjacent to the buffer region A on the right side is defined as a buffer region B, and a region at the right of the buffer region B is defined as a buffer region C. The number of buffer portions in each of the regions A, B, and C can be changed by setting.

When the actual distribution S2 of the times when the packets arrive is shifted leftward from the target distribution S0 of the times when the packets arrive, as shown in FIG. 9a, the packet which has arrived is stored in the buffer region A in the jitter buffer 33. When the packet which has arrived is stored in the buffer region A in the jitter buffer 33, the delay time control unit 39 performs processing equivalent to processing for duplicating the packets stored in the jitter buffer 33.

Specifically, the packets read out of the jitter buffer 33 and fed to the decoder 34 are controlled such that one of the packets read out of the jitter buffer 33 is fed to the decoder 34 and held at certain timing of decoding, and the held packet (the packet read out at the previous timing of decoding) is fed to the decoder 34 without reading out the new packet from the jitter buffer 33 at the subsequent timing of decoding. As a result, a delay time period elapsed from the time when the packet is stored in the jitter buffer 33 until the packet is decoded is lengthened. An operation mode in which such control is carried out by the delay time control unit 39 is referred to as a delay time extending mode.

On the other hand, when the actual distribution S1 of the times when the packets arrive is shifted rightward from the target distribution S0 of the times when the packets arrive, as shown in FIG. 9b, the packet which has arrived is not stored in a region composed of the buffer regions A and B in the jitter buffer 33 for a predetermined time period. That is, the packet which has arrived is stored in only the buffer region C for a predetermined time period. When the packet which has arrived is not stored in the region composed of the buffer regions A and B for the predetermined time period, the delay time control unit 39 performs processing equivalent to processing for deleting (thinning) the packets stored in the jitter buffer 33.

Specifically, the packets read out of the jitter buffer 33 and fed to the decoder 34 are controlled such that two of the packets are continuously read out of the jitter buffer 33 at the timing of decoding, and one of the packets is discarded and only the other packet is fed to the decoder 34. As a result, a delay time period elapsed from the time when the packet is stored in the jitter buffer 33 until the packet is decoded is shortened. An operation mode in which such control is carried out by the delay time control unit 39 is referred to as a delay time shortening mode.

The delay time control unit 39 performs such operations as to read out the one packet from the jitter buffer 33 at the timing of decoding in a normal operation mode and feed the packet to the decoder 34.

Figure 14:
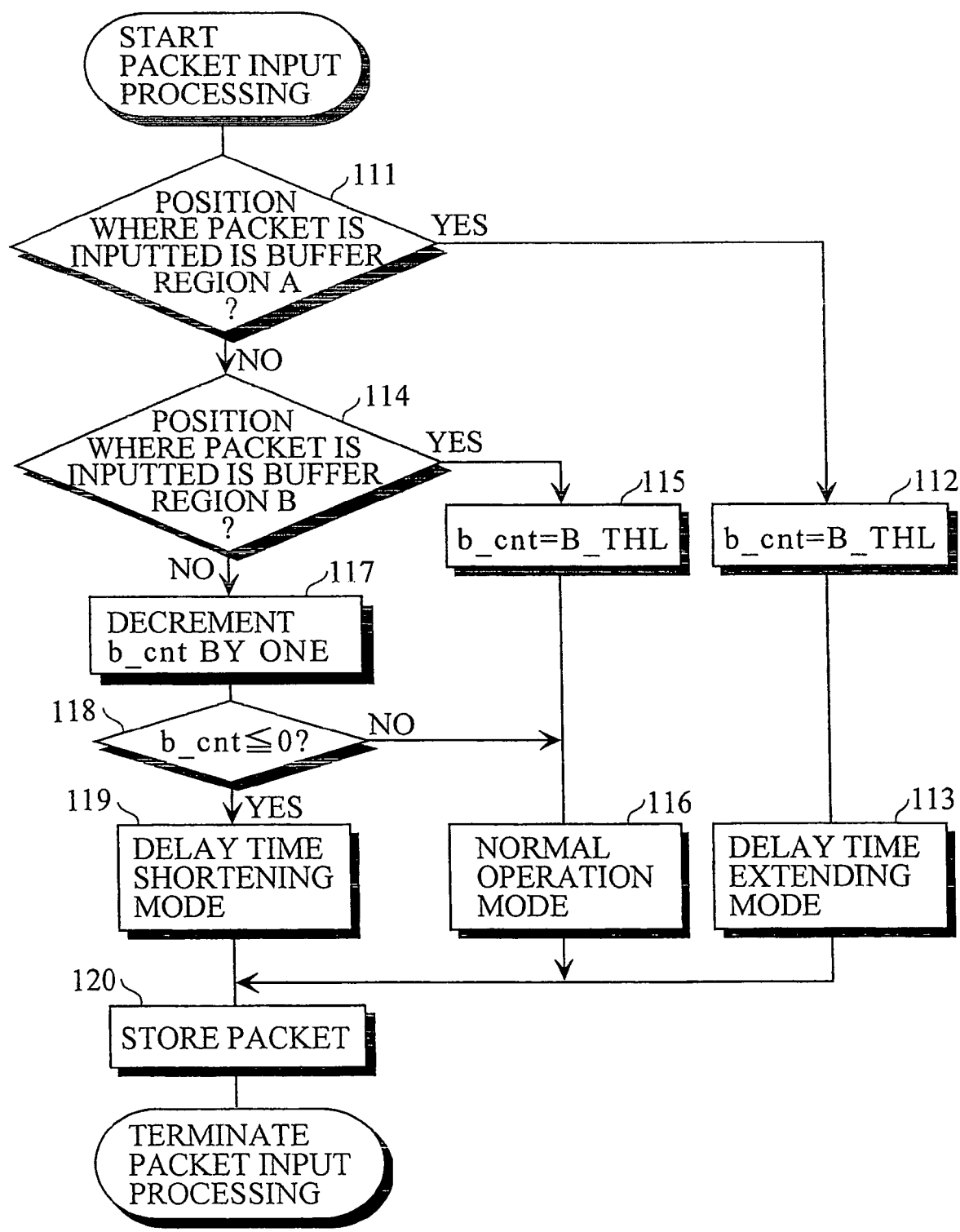
FIG. 14 is a flow chart showing the procedure for operation mode determination processing performed by a delay time control unit 39 shown in FIG. 13.

FIG. 14 shows the procedure for processing for determining an operation mode by the delay time control unit 39.

In initialization processing performed when the power is turned on, it is assumed that a predetermined value B_THL (e.g., 100) is set in a counter b_cnt, and a normal operation mode is set as an operation mode of the delay time control unit 39.

Delay time control processing is performed every time processing for inputting the packet which has arrived to the jitter buffer 33 is started.

When the packet input processing is started, it is judged whether or not the position where the packet is inputted to the jitter buffer 33 is the buffer region A shown in FIG. 8 (step 111). When the position where the packet is inputted is the buffer region A, it is judged that the actual distribution S2 of the times when the packets arrive is shifted leftward from the target distribution S0 of the times when the packets arrive, as shown in FIG. 9a, to store the predetermined value B_THL in the counter b_cnt (step 112), and set the operation mode to the delay time extending mode (step 113). The packet is stored in the jitter buffer 33 (step 120), to terminate the current packet input processing.

When it is judged in the foregoing step 111 that the position where the packet is inputted is not the buffer region A, it is judged whether or not the position where the packet is inputted is the buffer region B (step 114). When the position where the packet is inputted is the buffer region B, it is judged that the possibility that the actual distribution of the times when the packets arrive coincides with the target distribution of the times when the packets arrive is high, to store the predetermined value B_THL in the counter b_cnt (step 115), and set the operation mode to a normal operation mode (step 116). The packet is stored in the jitter buffer 33 (step 120), to terminate the current packet input processing.

When it is judged in the foregoing step 114 that the position where the packet is inputted is not the buffer region B, the counter value b_cnt is decremented by one (step 117). It is judged whether or not the counter value b_cnt is not more than zero (step 118). When the counter value b_cnt is more than zero, it is judged that the possibility that the actual distribution of the times when the packets arrive coincides with the target distribution of the times when the packets arrive is high, to set the operation mode to a normal operation mode (step 116). The packet is stored in the jitter buffer 33 (step 120), to terminate the current packet input processing.

When it is judged in the foregoing step 118 that the counter value b_cnt is not more than zero, it is judged that the actual distribution S1 of the times when the packets arrive is shifted rightward from the target distribution S0 of the times when the packets arrive, as shown in FIG. 9b, to set the operation mode to the delay time shortening mode (step 119). The packet is stored in the jitter buffer 33 (step 120), to terminate the current packet input processing.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. An audio decoding device including a jitter buffer comprising a plurality of buffer portions for storing a received packet, and decoding means for decoding the packet stored in the jitter buffer, wherein the received packet is stored in a position corresponding to its packet number in the jitter buffer by using a packet number of a packet stored in a buffer portion at an output end of the jitter buffer as a reference packet number, the audio decoding device comprising:
  playback speed change means for changing, with respect to a decoded audio signal obtained by the decoding means, the playback speed thereof;
  an output buffer for temporarily storing a digital audio signal outputted from the playback speed change means;
  means for reading out the digital audio signals stored in the output buffer at predetermined time intervals;
  playback speed control means for controlling the playback speed change means on the basis of the position in which the received packet is stored in the jitter buffer; and
  decoding timing control means for controlling the timing of decoding by the decoding means on the basis of the amount of data stored in the output buffer;
  wherein
  a first region, a second region and a third region are set within the jitter buffer, the first region being composed of a given number of buffer portions from the output end of the jitter buffer, the second region being composed of a given number of buffer portions and lying between the first region and an opposite end of the output end in the jitter buffer, and the third region being composed of a given number of buffer portions and lying between the second region and the opposite end of the output end in the jitter buffer; and the playback speed control means controls the playback speed change means such that the playback speed is reduced when the received packet is stored in the first region of the jitter buffer, while controlling the playback speed change means such that the playback speed is increased when at least a predetermined number of packets, which arrive consecutively, is stored in the third region of the jitter buffer.

2. The audio decoding device according to claim 1, characterized in that the decoding timing control means requires the decoding means to decode the packet when the amount of data stored in the output buffer is less than a predetermined reference value.

3. An audio decoding device including a jitter buffer comprising a plurality of buffer portions for storing a received packet, and decoding means for decoding the packet stored in the jitter buffer, wherein the received packet is stored in a position corresponding to its packet number in the jitter buffer by using a packet number of a packet stored in a buffer portion at an output end of the jitter buffer as a reference packet number, and a first region, a second region and a third region are set within the jitter buffer, the first region being composed of a given number of buffer portions from the output end of the jitter buffer, the second region being composed of a given number of buffer portions and lying between the first region and an opposite end of the output end in the jitter buffer, and the third region being composed of a given number of buffer portions and lying between the second region and the opposite end of the output end in the jitter buffer, the audio decoding device comprising:

delay time control means for carrying out such control that a delay time period elapsed from the time when the packet is stored in the jitter buffer until the packet is decoded is lengthened when the received packet is stored in the first region of the jitter buffer, while carrying out such control that a delay time period elapsed from the time when the packet is stored in the jitter buffer until the packet is decoded is shortened when at least a predetermined number of packets, which arrive consecutively, is stored in the third region of the jitter buffer.

4. The audio decoding device according to claim 3, characterized in that the delay time control means comprises playback speed change means for changing, with respect to a decoded audio signal obtained by the decoding means, the playback speed thereof, an output buffer for temporarily storing a digital audio signal outputted from the playback speed change means, means for reading out the digital audio signals stored in the output buffer at predetermined time intervals, and means for controlling the playback speed change means such that the playback speed is reduced when the received packet is stored in the first region of the jitter buffer, while controlling the playback speed change means such that the playback speed is increased when at least a predetermined number of packets, which arrive consecutively, is stored in the third region of the jitter buffer, and decoding timing control means for controlling the timing of decoding by the decoding means on the basis of the amount of data stored in the output buffer.

5. The audio decoding device according to claim 3, characterized in that the delay time control means controls the packet to be read out of the jitter buffer and fed to the decoding means such that the packet read out of the jitter buffer at the timing of packet reading is repeatedly decoded at the timing of packet reading continued a plurality of number of times including the current time, and the read-out of the packet from the jitter buffer is inhibited during the decoding when the received packet is stored in the first region of the jitter buffer, while controlling the packet to be read out of the jitter buffer and fed to the decoding means such that the plurality of packets stored in the jitter buffer are read out at a time at the timing of packet reading, and only one of the plurality of packets read out is decoded when at least a predetermined number of packets, which arrive consecutively, is stored in the third region of the jitter buffer.

6. A network telephone set including a jitter buffer comprising a plurality of buffer portions for storing a received packet, and decoding means for decoding the packet stored in the jitter buffer, wherein the received packet is stored in a position corresponding to its packet number in the jitter buffer by using a packet number of a packet stored in a buffer portion at an output end of the jitter buffer as a reference packet number, the network telephone set comprising:

playback speed change means for changing, with respect to a decoded audio signal obtained by the decoding means, the playback speed thereof;

an output buffer for temporarily storing a digital audio signal outputted from the playback speed change means;

means for reading out the digital audio signals stored in the output buffer at predetermined time intervals;

playback speed control means for controlling the playback speed change means on the basis of the position in which the received packet is stored in the jitter buffer; and decoding timing control means for controlling the timing of decoding by the decoding means on the basis of the amount of data stored in the output buffer;

wherein a first region, a second region and a third region are set within the jitter buffer, the first region being composed of a given number of buffer portions from the output end of the jitter buffer, the second region being composed of a given number of buffer portions and lying between the first region and an opposite end of the output end in the jitter buffer, and the third region being composed of a given number of buffer portions and lying between the second region and the opposite end of the output end in the jitter buffer; and the playback speed control means controls the playback speed change means such that the playback speed is reduced when the received packet is stored in the first region of the jitter buffer, while controlling the playback speed change means such that the playback speed is increased when at least a predetermined number of packets, which arrive consecutively, is stored in the third region of the jitter buffer.

7. The network telephone set according to claim 6, characterized in that the decoding timing control means requires the decoding means to decode the packet when the amount of data stored in the output buffer is less than a predetermined reference value.

8. A network telephone set including a jitter buffer comprising a plurality of buffer portions for storing a received packet, and decoding means for decoding the packet stored in the jitter buffer, wherein the received packet is stored in a position corresponding to its packet number in the jitter buffer by using a packet number of a packet stored in a buffer portion at an output end of the jitter buffer as a reference packet number and a first region, a second region and a third region are set within the jitter buffer, the first region being composed of a given number of buffer portions from the output end of the jitter buffer, the second region being composed of a given number of buffer portions and lying between the first region and an opposite end of the output end in the jitter buffer, and the third region being composed of a given number of buffer portions and lying between the second region and the opposite end of the output end in the jitter buffer, the network telephone set comprising:

delay time control means for carrying out such control that a delay time period elapsed from the time when the packet is stored in the jitter buffer until the packet is decoded is lengthened when the received packet is stored in the first region of the jitter buffer, while carrying out such control that a delay time period elapsed from the time when the packet is stored in the jitter buffer until the packet is decoded is shortened when at least a predetermined number of packets, which arrive consecutively, is stored in the third region of the jitter buffer.

9. The network telephone set according to claim 8, characterized in that the delay time control means comprises playback speed change means for changing, with respect to a decoded audio signal obtained by the decoding means, the playback speed thereof, an output buffer for temporarily storing a digital audio signal outputted from the playback speed change means, means for reading out the digital audio signals stored in the output buffer at predetermined time intervals, and means for controlling the playback speed change means such that the playback speed is reduced when the received packet is stored in the first region of the jitter, while controlling the playback speed change means such that the playback speed is increased when at least a predetermined number of packets, which arrive consecutively, is stored in the third region of the jitter buffer, and decoding timing control means for controlling the timing of decoding by the decoding means on the basis of the amount of data stored in the output buffer.

10. The network telephone set according to claim 8, characterized in that the delay time control means controls the packet to be read out of the jitter buffer and fed to the decoding means such that the packet read out of the jitter buffer at the timing of packet reading is repeatedly decoded at the timing of packet reading continued a plurality of number of times including the current time, and the read-out of the packet from the jitter buffer is inhibited during the decoding when the received packet is stored in the first region of the jitter buffer, while controlling the packet to be read out of the jitter buffer and fed to the decoding means such that the plurality of packets stored in the jitter buffer are read out at a time at the timing of packet reading, and only one of the plurality of packets read out is decoded when at least a predetermined number of packets, which arrive consecutively, is stored in the third region of the jitter buffer.

* * * * *